(12) United States Patent
Muldowney-Colston et al.

(10) Patent No.: US 7,323,842 B2
(45) Date of Patent: Jan. 29, 2008

(54) ROTATING ELECTRICAL MACHINE

(75) Inventors: Tony Elijah Muldowney-Colston, Hong Kong (CN); Thomas Mahon Shaw, London (GB)

(73) Assignee: Dolphin Electric Holdings, Inc., Tortola (VG)

( * ) Notice: Subject to any disclaimer, the term of this patent is extended or adjusted under 35 U.S.C. 154(b) by 6 days.

(21) Appl. No.: 10/536,750

(22) PCT Filed: Nov. 27, 2003

(86) PCT No.: PCT/IB03/05459

§ 371 (c)(1),
(2), (4) Date: Sep. 22, 2005

(87) PCT Pub. No.: WO2004/051839

PCT Pub. Date: Jun. 17, 2004

(65) Prior Publication Data

US 2006/0156841 A1    Jul. 20, 2006

(30) Foreign Application Priority Data

Nov. 29, 2002 (GB) ................................ 0227976.8

(51) Int. Cl.
B60S 1/08 (2006.01)
(52) U.S. Cl. ...................... 318/444; 318/266; 318/267; 318/443
(58) Field of Classification Search ........ 318/260–283, 318/139, 254, 460–466
See application file for complete search history.

(56) References Cited

U.S. PATENT DOCUMENTS

| | | | | | |
|---|---|---|---|---|---|
| 1,318,779 | A | * | 10/1919 | Lum | 318/65 |
| 2,359,400 | A | * | 10/1944 | White | 318/266 |
| 2,454,882 | A | * | 11/1948 | Thurman | 324/113 |
| 2,455,247 | A | * | 11/1948 | Griest | 388/822 |
| 2,567,018 | A | * | 9/1951 | Oskar | 340/825.26 |
| 2,666,496 | A | * | 1/1954 | Willison | 95/5 |
| 2,812,484 | A | * | 11/1957 | De Westfelt | 318/266 |
| 2,992,378 | A | * | 7/1961 | Schneider | 318/267 |
| 3,178,627 | A | * | 4/1965 | Houk | 318/266 |
| 3,353,631 | A | * | 11/1967 | Burgy | 187/386 |
| 3,675,103 | A | * | 7/1972 | Elliott | 318/281 |
| 3,696,279 | A | * | 10/1972 | Gyori | 318/139 |
| 3,699,414 | A | * | 10/1972 | Gyori | 318/139 |
| 3,831,074 | A | * | 8/1974 | Smalser | 318/265 |
| 3,860,859 | A | * | 1/1975 | Buckley | 318/265 |

(Continued)

FOREIGN PATENT DOCUMENTS

CH            615 773            2/1980

(Continued)

*Primary Examiner*—Paul Ip
(74) *Attorney, Agent, or Firm*—Leydig, Voit & Mayer, Ltd.

(57) ABSTRACT

A rotating electrical machine has a housing with a shaft mounted rotatably in it. A rotor is fixed to the shaft and has a plurality of magnetic poles. A stator is positioned about the rotor and has a winding. A switch is mounted within the housing and has a first position for allowing current in one direction through the winding and a second position for allowing current in an opposite direction through the winding. A mechanical activator is movable with or by the shaft and acts on the switch to move it between the first and second positions.

18 Claims, 4 Drawing Sheets

U.S. PATENT DOCUMENTS

| | | | |
|---|---|---|---|
| 3,993,975 A * | 11/1976 | Long et al. | 340/932.2 |
| 4,079,299 A * | 3/1978 | Swindler et al. | 318/261 |
| 4,599,546 A * | 7/1986 | Uemura | 318/443 |
| 4,609,853 A * | 9/1986 | Mattern | 318/363 |
| 4,706,456 A | 11/1987 | Backe et al. | |
| 4,931,706 A * | 6/1990 | Gajewski | 318/282 |
| 5,005,382 A * | 4/1991 | Duve | 68/12.16 |
| 5,812,052 A * | 9/1998 | Swanger et al. | 340/433 |
| 5,998,949 A * | 12/1999 | Amagasa | 318/280 |

FOREIGN PATENT DOCUMENTS

| | | |
|---|---|---|
| EP | 1 077 523 | 2/2001 |
| GB | 683 152 | 11/1952 |
| GB | 719668 | 12/1954 |

\* cited by examiner

ROTATING ELECTRICAL MACHINE

FIELD OF THE INVENTION

The present invention relates to rotating electrical machines, that is machines which can be used either as electric motors, in which electrical energy is converted into movement, or as electric generators in which movement is converted into electrical power.

There are two known types of DC electric motors. In the first type, a DC electrical power source is connected to coils wound on a rotor by means of contact brushes and a commutator. The rotor rotates about, or within, a stator in the form of one or more permanent magnets or separately energised electromagnets. The commutator serves to switch is electrical current between the coils. In the second type, the rotor comprises a plurality of permanent magnets, and the stator comprises a number of wound coils Associated electrical circuitry controls the switching of electrical current between the stator coils.

The disadvantage of the first type is that electromechanical wear of the brushes and commutator limits the lifespan of the machine to 2000 hours. Also, as only one coil at a time is energised, there are limits placed on the efficiency of the machine. Furthermore, the sparks generated by the brushes and commutator create electromagnetic interference. The second type overcomes the problems mentioned above, but the use of drive electronics makes the machine much more costly to manufacture than the first type.

It would be desirable to provide a rotating electrical machine which overcomes, or at least ameliorates, some or all of the problems associated with the first type of motor, without the extra costs associated with the second type.

SUMMARY OF THE INVENTION

According to a first aspect of the invention there is provided a rotating electrical machine comprising:
a housing;
a shaft mounted rotatably within the housing;
a rotor fixed to the shaft and providing a magnetic field;
a stator positioned about the rotor within the housing and having a winding;
a switch mounted with the housing and having a first position for allowing current in one direction through the winding and a second position for allowing current in an opposite direction through the winding;
a mechanical activator movable with or by the shaft and acting on the switch so as to move it between the first and second positions when the winding is so aligned that current-inducing effects of the magnetic field on the winding are at or near a minimum.

According to a second aspect of the invention there is provided a rotating electrical machine comprising:
a housing;
a shaft mounted rotatably within the housing;
a rotor fixed to the shaft and having a plurality of poles made of ferromagnetic material;
a stator positioned about the rotor within the housing and having a winding;
a switch mounted within the housing and having a first position for allowing current in one direction through the winding and a second position for allowing current in an opposite direction through the winding;
a mechanical activator movable with or by the shaft and acting on the switch so as to move it between the first and second positions.

Preferably, the switch has a third position for not allowing current through the winding, and the mechanical activator moves the switch to the third position between the first and second positions.

Preferably, the mechanical activator comprises a cam mounted about the shaft and a cam follower communicating with the cam and with the switch.

Preferably, the cam has four portions for moving the switch to the first position for $\frac{1}{6}^{th}$ of a cycle and then to the third position for $\frac{1}{3}^{rd}$ of the cycle, and then to the second position for $\frac{1}{6}^{th}$ of the cycle, and then to the third position for $\frac{1}{3}^{rd}$ of the cycle.

Preferably, the mechanical activator comprises a crank and a linkage for moving the switch to the first position for $\frac{1}{6}^{th}$ of a cycle and then to the third position for $\frac{1}{3}^{rd}$ of the cycle, and then to the second position for $\frac{1}{6}^{th}$ of the cycle, and then to the third position for $\frac{1}{3}^{rd}$ of the cycle.

Preferably, there are three switches positioned 120 angular degrees apart, and the mechanical activator acts on all the switches to move them in a sequence.

Preferably, the electrical machine is a permanent magnet brushless DC electric motor.

Preferably, the electrical machine is a DC Switched reluctance motor.

Further aspects of the invention will become apparent from the following description, which is given by way of example only to illustrate the invention.

BRIEF DESCRIPTION OF THE DRAWINGS

Embodiments of the invention will now be described with reference to the accompanying drawings in which.

DETAILED DESCRIPTION

Figure 1:
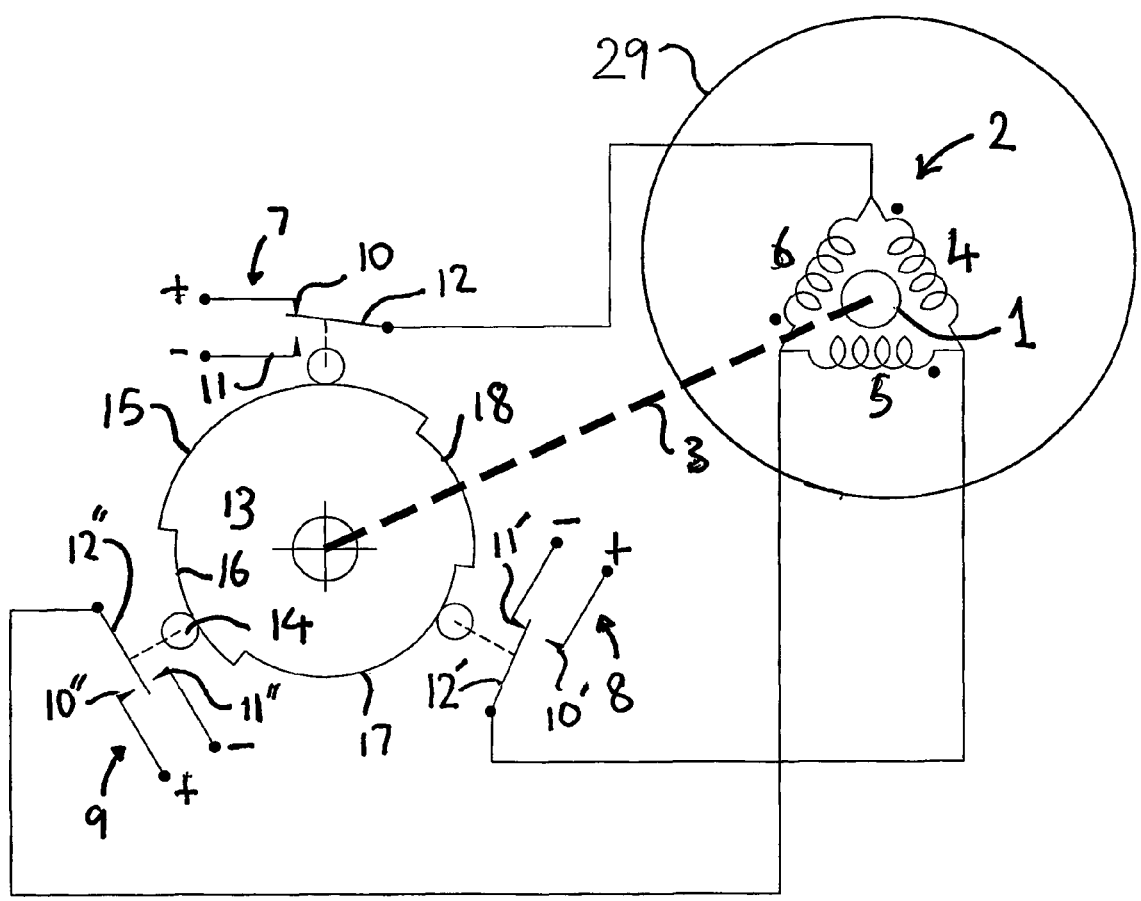
FIG. 1 is a schematic of a two-pole motor with cam operated switches according to the invention.

FIG. 1 illustrates a two-pole rotating electrical machine according to the invention. The machine comprises a housing 29 enclosing a rotor 1 and a field winding 2. The rotor 1 is mounted on a shaft 3 for rotation within the housing, and includes a permanent magnet for establishing a rotor magnetic field. The field winding 2 is positioned about the rotor 1 and includes three delta connected coils 4, 5, 6. This configuration of rotor 1 and field winding 2 is well known in the art and need not be described in further detail.

In the motor configuration electric current is supplied to the field coils 4, 5, 6 by three single-pole changeover switches 7, 8, 9 operating in sequence. The first fixed contact 10 of each changeover switch 7, 8, 9 is connected to a positive (+) side of a DC supply (not shown) and the second fixed contact 11 is connected to a negative (−) side of the DC supply. The moving switch contact 12 is connected to the field winding 2 to make a positive (+) or negative (−) DC connection to the winding 2 depending on the position of the switch.

Mounted at one end of shaft 5 is a stepped cam 13. Each switch 7, 8, 9 has a cam follower 14 that contacts the outer cam surface. The switches 7, 8, 9 are arranged 120 mechanical degrees apart about the cam 12.

The outer surface of the cam is divided into 4 portions 15, 16, 17, 18. Cam portions 15 and 17 are diametrically opposed and each occupies ⅓ of the outer circumference of the cam 13. Cam portions 16 and 18 are diametrically disposed and interspersed between portions 15 and 17, and each occupies ⅙ of the outer circumference of the cam 13.

Cam portion 15 is shaped so that when the follower 14 of a switch, e.g. switch 7 and FIG. 1, is in contact with surface 15 the switch connection is made to the positive (+) of the DC supply. Cam portions 16 and 18 are shaped so that when the follower 14 of a switch, e.g. switch 8 in FIG. 1, is in contact with those portions no connection is made to the DC supply. Cam portion 17 is shaped so that when the follower 14 of a switch, e.g. switch 6 in FIG. 1, is in contact with surface 17 a connection is made to the negative (−) of the DC supply. According to this arrangement each field coil 4, 5, 6 is energised in the sequence of $\frac{1}{3}^{rd}$ of an electrical cycle connected to the positive (+) supply followed by $\frac{1}{6}^{th}$ of the cycle with no connection followed by $\frac{1}{3}^{rd}$ of the cycle connected to the negative (−) supply followed by $\frac{1}{6}^{th}$ of the cycle with no connection. The cycle then repeats. Each node of the field coil 4, 5, 6 receives the DC supply 120 electrical degrees later than the previous one. The effect of this is to cause a rotating magnetic field which causes the rotor 1 to turn which then changes the electrical connections and so causes the field to rotate and so on.

Figure 2:
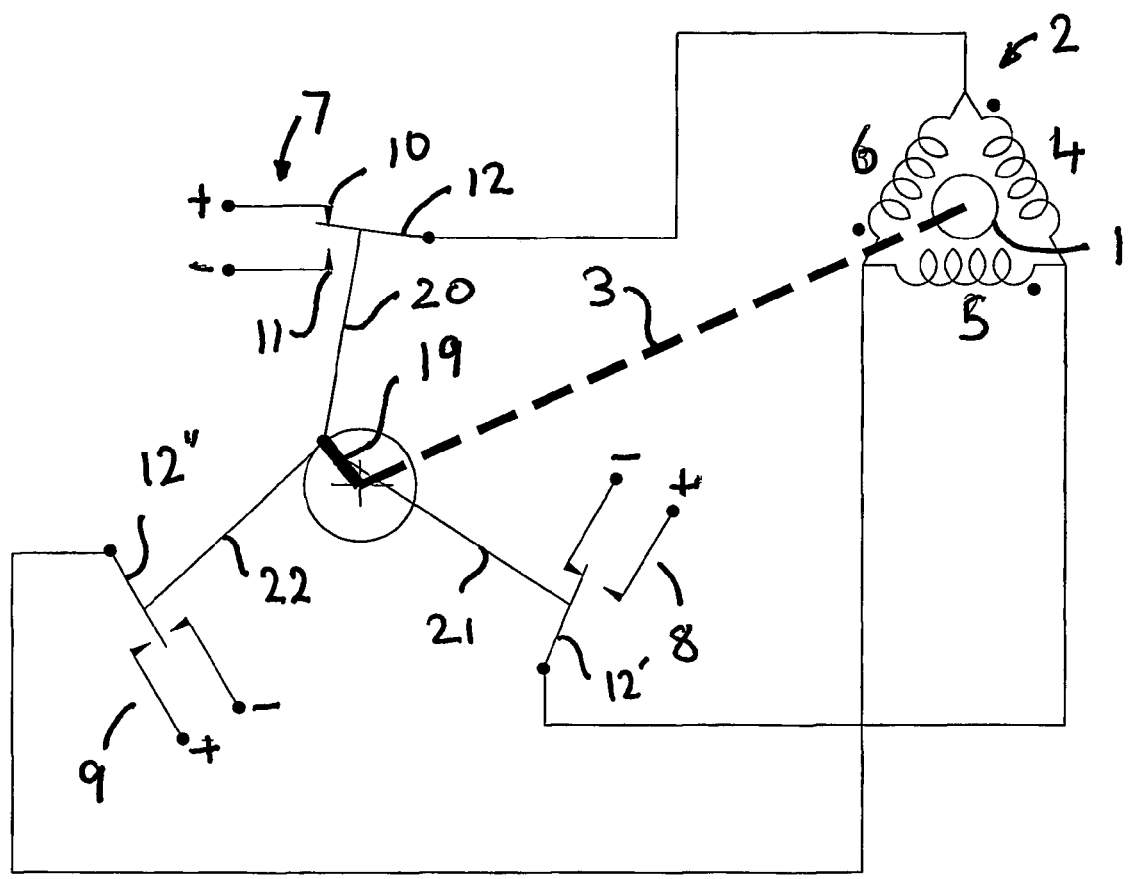
FIG. 2 is a schematic of a two-pole motor with eccentric or crank operated switches according to the invention.

FIG. 2 illustrates a second embodiment of the motor according to the invention. In this embodiment the cam 12 is replaced by a crank or eccentric 19 with linkages 20, 21, 22 moving the movable contacts 20 of changeover switches 7, 8, 9. The changeover switches 7, 8, 9 are located 120 mechanical degrees apart about the crank 19. The switching sequence is the same as for the embodiment in FIG. 1 with each changeover switch 7, 8, 9 conducting the positive (+) supply for $\frac{1}{3}^{rd}$ of the cycle, followed by a non-conducting period of $\frac{1}{6}^{th}$ of the cycle, followed by conducting the negative (−) supply for $\frac{1}{3}^{rd}$ of the cycle, and a non-conducting period of remaining $\frac{1}{6}^{th}$ of the cycle.

In the two-pole motor embodiments described above one electrical cycle occurs with each mechanical revolution of the shaft 3 and rotor 1. The skilled addressee will understand that an electrical cycle must occur twice with each mechanical rotation of a four-pole machine, three times for each rotation for a six-pole machine and so on. This can be achieved using a gearing arrangement as shown in FIGS. 3 and 4.

Figure 3:
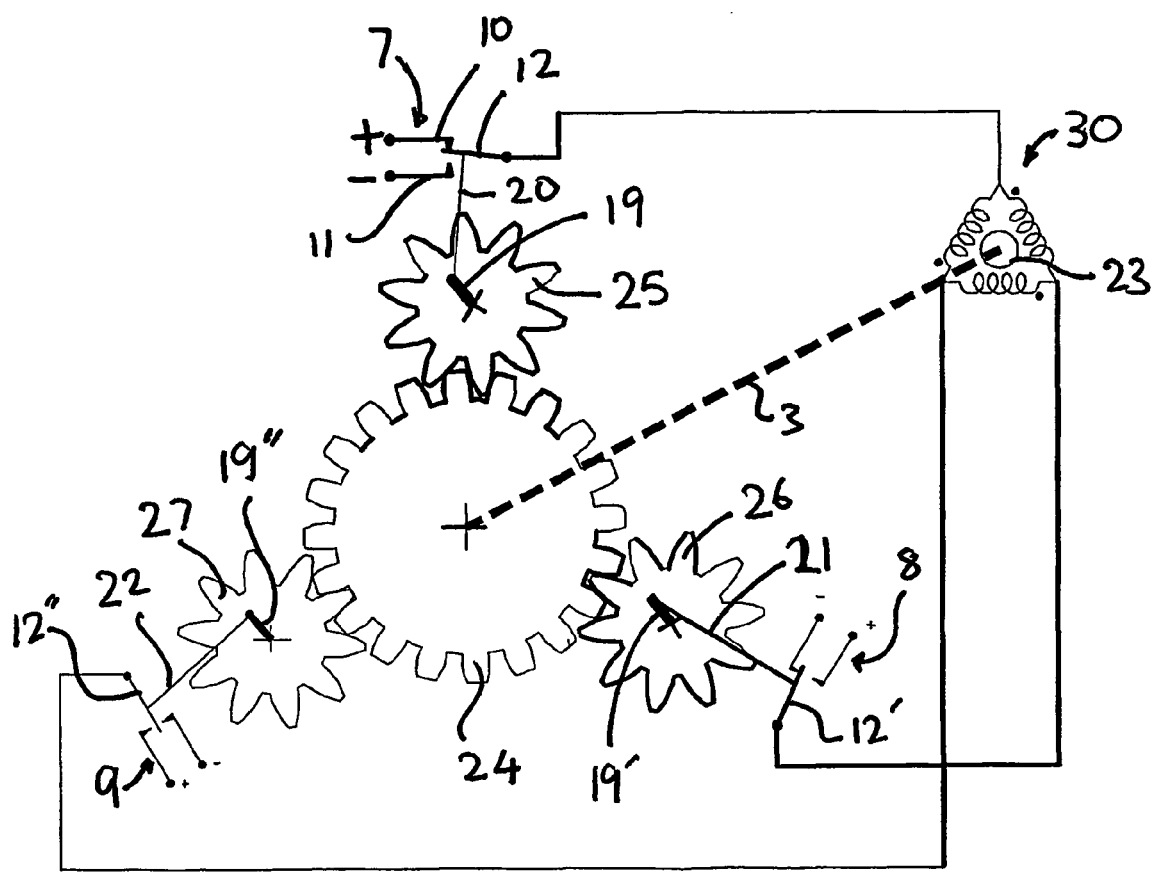
FIG. 3 is a schematic of a first embodiment of a four-pole motor with eccentric or crank operated switches according to the invention.

FIG. 3 illustrates a four-pole motor with a geared eccentric or crank operated switches. The rotor 23 of the four-pole motor has a plurality of permanent magnets for providing four-poles. The field winding 30 has six coils connected in known manner. A main gear 24 is positioned on the end of shaft 3 and drives three pinion gears 25, 26, 27 mounted at 120 degree intervals about its periphery. Each pinion gear 25, 26, 27 has a crank or eccentric 19 with a linkage 20, 21, 22 moving the movable contacts 20 of changeover switches 7, 8, 9. The ratio of the main gear 24 and pinion gears 25, 26, 27 is 2:1 so that the changeover switches 7, 8, 9 complete two electrical cycles for each complete mechanical rotation of the shaft 3 and rotor 23.

Figure 4:
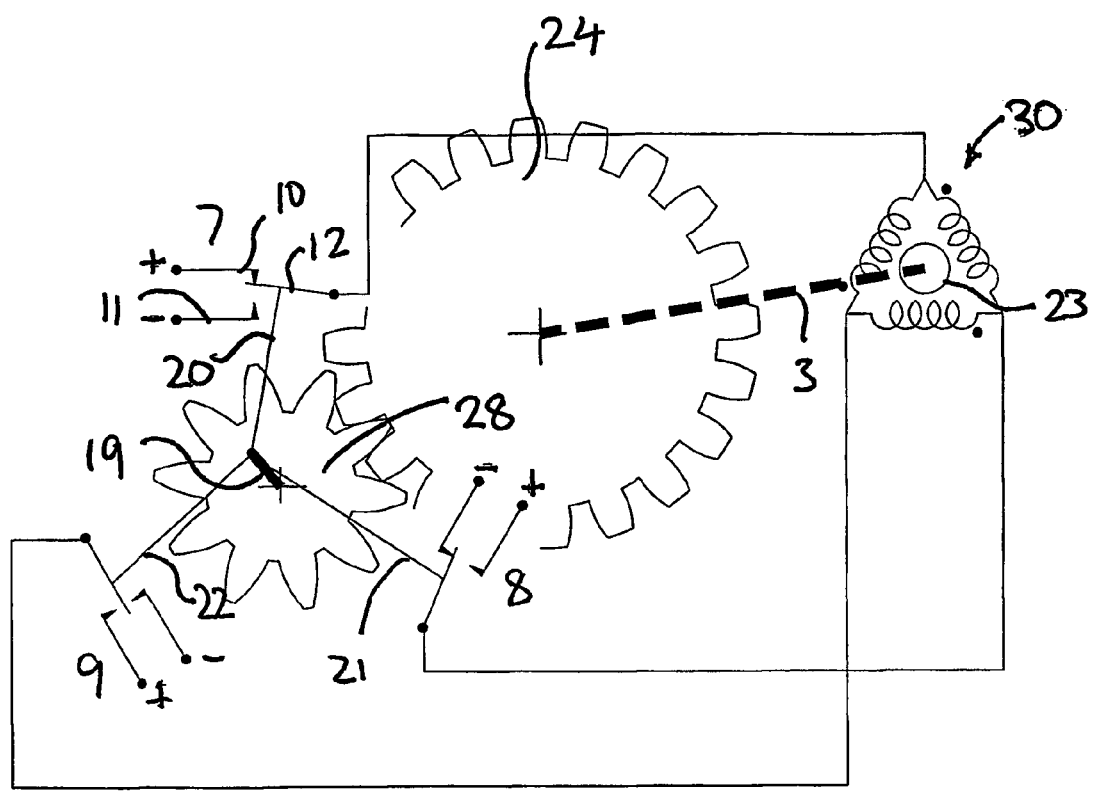
FIG. 4 is a schematic of a second embodiment of a four-pole motor with eccentric or crank operated switches.

FIG. 4 illustrates an alternative embodiment of the four-pole motor with a geared eccentric or crank operated switches. A single pinion gear 28 is driven from the main gear 24. The single pinion 28 has a crank or eccentric 19 with all linkages 20, 21, 22 connected to it. The changeover switches 7, 8, 9 are positioned at 120 degree intervals about the pinion 28. The gear ratio of the main gear 24 and pinion 28 is 2:1 so that the change over switches 7, 8, 9 complete two electrical cycles for each complete mechanical rotation of the shaft 3 and rotor 23.

It will be understood by the skilled addressee that as the number of stator coils and rotor poles of the machine increase the gear ratio increases to give an appropriate number of electrical cycles per mechanical revolution of the shaft and rotor. Furthermore, in the above examples the field windings are connected in the 'Delta' configuration, but this does not preclude the 'Star' connection.

It should also be noted that although the embodiment is described is a permanent magnet DC motor, the invention could equally well be applied to a DC switched reluctance machine, in which case the cam/eccentric switches the current on as a rotor pole approaches a stator pole and coil, and switches the current off as a rotor pole becomes fully engaged with a stator pole and coil.

A rotating electrical machine according to the invention has the advantage of extremely low manufacturing and maintenance costs as the machine requires neither drive electronics nor a brush and commutator set.

In the described embodiments a cam and follower mechanism and an eccentric/crank and connecting rod mechanism are used to relate the opening and changeover actions of three single pole changeover switches to shaft angular position. The inventors consider these to be the simplest variety of mechanism for the desired function. However, it is well within the capability of the skilled addressee to devises a range of mechanisms to fulfill the desired function, and such are considered within the scope of the invention.

Where in the foregoing description reference has been made to integers or elements have known equivalents then such are included as if individually set forth herein.

Embodiments of the invention have been described, however it is understood that variations, improvements or modifications can take place without departure from the spirit of the invention or scope of the appended claims.

The invention claimed is:

1. A rotating electrical machine comprising:
   a housing;
   a shaft mounted rotatably within the housing;
   a rotor fixed to the shaft and providing a magnetic field;
   a stator positioned about the rotor within the housing and having a winding;
   a switch mounted within the housing and having a first position allowing current flow in a first direction through the winding and a second position for allowing current flow in a second direction, opposite the first direction, through the winding;
   a mechanical activator movable by the shaft and acting on the switch to move the switch between the first and second positions when the winding is aligned so that current-inducing effects of the magnetic field on the winding are at or near a minimum, wherein, in use, the rotor rotates in only a single direction.

2. The electrical machine of claim 1 wherein the switch has a third position for not allowing current flow through the winding, and the mechanical activator moves the switch to the third position between the first and second positions.

3. The electrical machine of claim 2 wherein the mechanical activator comprises a cam mounted on the shaft and a cam follower communicating with the cam and with the switch.

4. The electrical machine of claim 3 wherein the cam has four portions for respectively moving the switch to the first position for $\frac{1}{6}^{th}$ of a cycle, then to the third position for $\frac{1}{3}^{rd}$ of the cycle, then to the second position for ⅙$^{th}$ of the cycle, and then to the third position for ⅓$^{rd}$ of the cycle.

5. The electrical, machine of claim 2 wherein the mechanical activator comprises a crank and a linkage for moving the switch to the first position for ⅙$^{th}$ of a cycle, and then to the third position for ⅓$^{rd}$ of the cycle, then to the second position for ⅙$^{th}$ of the cycle, and then to the third position for ⅓$^{rd}$ of the cycle.

6. The electrical machine of claim 2 including three switches positioned 120 angular degrees apart, and wherein the mechanical activator acts on all three switches to move them in a sequence.

7. The electrical machine of claim 2 wherein the electrical machine is a permanent magnet brushless DC electric motor.

8. The electrical machine of claim 2 wherein the electrical machine is a DC switched reluctance motor.

9. The electrical machine of claim 1 including three switches positioned 120 angular degrees apart, and wherein the mechanical activator acts on all three switches to move them in a sequence.

10. The electrical machine of claim 1 wherein the electrical machine is a permanent magnet brushless DC electric motor.

11. The electrical machine of claim 1 wherein the electrical machine is a DC switched reluctance motor.

12. The electrical machine of claim 1 wherein the mechanical activator comprises a cam mounted on the shaft and a cam follower communicating with the cam and with the switch.

13. A rotating electrical machine comprising:
a housing;
a shaft mounted rotatably within the housing;
a rotor fixed to the shaft and having a plurality of poles made of ferromagnetic material;
a stator positioned about the rotor within the housing and having a winding;
a switch mounted within the housing and having a first position for allowing current flow in a first direction through the winding and a second position for allowing current flow in a second direction, opposite the first direction, through the winding;
a mechanical activator movable by the shaft and acting on the switch to move the switch between the first and second positions, wherein, in use, the rotor rotates in only a single direction.

14. The electrical machine of claim 13 wherein the switch has a third position for not allowing current flow through the winding, and the mechanical activator moves the switch to the third position between the first and second positions.

15. The electrical machine of claim 13 wherein the mechanical activator comprises a cam mounted on the shaft and a cam follower communicating with the cam and with the switch.

16. The electrical machine of claim 13 including three switches positioned 120 angular degrees apart, and wherein the mechanical activator acts on all three switches to move them in a sequence.

17. The electrical machine of claim 13 wherein the electrical machine is a permanent magnet brushless DC electric motor.

18. The electrical machine of claim 13 wherein the electrical machine is a DC switched reluctance motor.

* * * * *